(12) United States Patent
Hsu et al.

(10) Patent No.: US 6,515,087 B2
(45) Date of Patent: Feb. 4, 2003

(54) SYNTHESIS OF ELASTOMERS HAVING LOW HYSTERESIS

(75) Inventors: Wen-Liang Hsu, Cuyahoga Falls, OH (US); Adel Farhan Halasa, Bath, OH (US); Scott McDowell Christian, Clinton, OH (US); Michael Lester Kerns, Elyria, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/016,069

(22) Filed: Dec. 6, 2001

(65) Prior Publication Data

US 2002/0120082 A1 Aug. 29, 2002

Related U.S. Application Data

(60) Provisional application No. 60/255,528, filed on Dec. 14, 2000.

(51) Int. Cl.⁷ .................................................. C08F 4/48
(52) U.S. Cl. .................. 526/180; 526/181; 526/340; 525/331.9; 525/342; 525/371; 524/445; 524/571; 524/575
(58) Field of Search ................. 526/180, 181, 526/340; 525/331.9, 342, 371; 524/445, 571, 575

(56) References Cited

U.S. PATENT DOCUMENTS

| | | | |
|---|---|---|---|
| 4,935,471 A | | 6/1990 | Halasa et al. ............ 525/359.1 |
| 5,332,810 A | * | 7/1994 | Lawson et al. ......... 526/180 X |
| 5,625,017 A | * | 4/1997 | Morita et al. ................ 526/180 |
| 5,932,662 A | | 8/1999 | Lawson et al. ............. 525/280 |
| 6,080,835 A | | 6/2000 | Lawson et al. ............. 528/396 |
| 6,084,025 A | | 7/2000 | Kitamura et al. ........... 524/575 |

OTHER PUBLICATIONS

English Language Translation of Japanese Kokoku Pat. No. 48–17674, published May 31, 1973.*

Rubber Technology,, 3rd ed, Van Nostrand Reinhold, N.Y., 1987, pp. 86–93.*

* cited by examiner

Primary Examiner—Fred Teskin
(74) Attorney, Agent, or Firm—Alvin T. Rockhill

(57) ABSTRACT

It is important for rubbery polymers that are used in tires, hoses, power transmission belts and other industrial products to have good compatibility with fillers, such as carbon black, silica, clay (including organoclays), and mixtures thereof. To attain improved interaction with fillers such rubbery polymers can be functionalized with various compounds, such as amines. The present invention discloses a process for synthesizing a rubbery polymer that is functionalized to attain improved compatibility with fillers. The present invention more specifically disclosed a process for synthesizing a rubbery polymer that comprises (1) continuously charging (a) a conjugated diolefin monomer, (b) an organolithium compound, and (c) an amine compound into a polymerization zone, wherein the amine compound is selected from the group consisting of alkyl, dialkyl, cycloalkyl or dicycloalkyl amine compounds of the general formula:

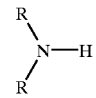

wherein R represents an alkyl group, a cycloalkyl group, or an alkaryl group containing from 1 to about 12 carbon atoms, and cyclic amine compounds of the general formula:

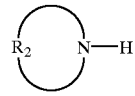

wherein $R_2$ represents a divalent alkylene, bicycloalkane, substituted alkylene, oxy- or N-alkylamino-alkylene group containing from about 3 to about 16 methylene groups; (2) allowing the conjugated diolefin monomer to polymerize in the polymerization zone to produce the rubbery polymer; and (3) continuously withdrawing the rubbery polymer from the polymerization zone.

20 Claims, No Drawings

SYNTHESIS OF ELASTOMERS HAVING LOW HYSTERESIS

This application claims the benefit of Provisional application Ser. No. 60/255,528, filed Dec. 14, 2000.

TECHNICAL FIELD

The subject invention relates to the continuous anionic polymerization of conjugated diolefin monomers that produces rubbery polymers having low hysteresis characteristics and excellent interaction with fillers, such as carbon black and/or silica.

BACKGROUND OF THE INVENTION

It is important for rubbery polymers that are used in tires, hoses, power transmission belts and other industrial products to have good compatibility with fillers, such as carbon black and silica. To attain improved interaction with fillers such rubbery polymers can be functionalized with various compounds, such as amines. U.S. Pat. No. 4,935,471 discloses a process for preparing a polydiene having a high level of affinity for carbon black which comprises reacting a metal terminated polydiene with a capping agent selected from the group consisting of (a) halogenated nitrites having the structural formula X—A—C≡N, wherein X represents a halogen atom and wherein A represents an alkylene group containing from 1 to 20 carbon atoms, (b) heterocyclic aromatic nitrogen containing compounds, and (c) alkyl benzoates. The capping agents disclosed by U.S. Pat. No. 4,935,471 react with metal terminated polydienes and replace the metal with a terminal cyanide group, a heterocyclic aromatic nitrogen containing group or a terminal group which is derived from an alkyl benzoate. For example, if the metal terminated polydiene is capped with a nitrite, it will result in the polydiene chains being terminated with cyanide groups. The use of heterocyclic aromatic nitrogen containing compounds as capping agents can result in the polydiene chains being terminated with a pyrrolyl group, an imidazolyl group, a pyrazolyl group, a pyridyl group, a pyrazinyl group, a pyrimidinyl group, a pyridazinyl group, an indolizinyl group, an isoindolyl group, a 3-H-indolyl group, a cinnolinyl group, a pteridinyl group, a .beta.-carbolinyl group, a perimidinyl group, a phenanthrolinyl group or the like.

U.S. Pat. No. 4,935,471 also discloses that lithium amides are highly preferred initiators because they can be used to prepare polydienes which are terminated with polar groups at both ends of their polymer chains. The extra polar functionality provided by lithium amides results in increased interaction with carbon black resulting in better polymer-carbon black dispersion. The lithium amides disclosed by U.S. Pat. No. 4,935,471 include lithium pyrrolidide. U.S. Pat. No. 4,935,471 also indicates that preferred initiators include amino alkyl lithium compounds of the structural formula:

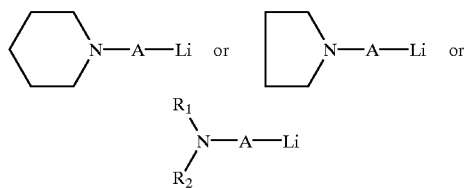

wherein A represents an alkylene group containing from 1 to 20 carbon atoms, and wherein $R_1$ and $R_2$ can be the same or different and represent alkyl groups containing from 1 to 20 carbon atoms.

It is also desirable for synthetic rubbers to exhibit low levels of hysteresis. This is particularly important in the case of rubbers that are used in tire tread compounds. Such polymers are normally compounded with sulfur, carbon black, accelerators, antidegradants and other desired rubber chemicals and are then subsequently vulcanized or cured into the form of a useful article. It has been established that the physical properties of such cured rubbers depend upon the degree to which the carbon black is homogeneously dispersed throughout the polydiene rubber. This is in turn related to the level of affinity that carbon black has for the rubber. This can be of practical importance in improving the physical characteristics of rubber articles that are made utilizing polydiene rubbers. For example, the rolling resistance and tread wear characteristics of tires can be improved by increasing the affinity of carbon black to the rubbery polymers utilized therein. Therefore, it would be highly desirable to improve the affinity of a given polydiene rubber for carbon black and/or silica. This is because a better dispersion of carbon black throughout polydiene rubbers which are utilized in compounding tire tread compositions results in a lower hysteresis value and consequently tires made therefrom have lower rolling resistance. It is also known that a major source of hysteresis is due to polymer chain ends that are not capable of full elastic recovery. Accordingly, improving the affinity of the rubber chain ends to the filler is extremely important in reducing hysteresis.

U.S. Pat. No. 6,080,835 discloses a functionalized elastomer comprising: a functional group defined by the formula:

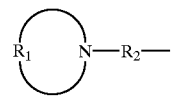

where $R_1$ is a selected from the group consisting of a divalent alkylene group, an oxy-alkylene group, an amino alkylene group, and a substituted alkylene group, each group having from about 6 to about 20 carbon atoms, $R_2$ is covalently bonded to the elastomer and is selected from the group consisting of a linear-alkylene group, a branched-alkylene group, and a cyclo-alkylene group, each group having from about 2 to about 20 carbon atoms.

U.S. Pat. No. 5,932,662 discloses a method of preparing a polymer comprising: preparing a solution of one or more anionically polymerizable monomers in a solvent; and, polymerizing under effective conditions, said monomers in the presence of a polymerization initiator having the formula

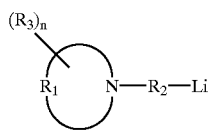

wherein $R_1$ is a divalent alkylene, an oxy- or amino-alkylene having from 6 to about 20 carbon atoms; and, $R_2$ is a linear-, branched-or cyclo-alkylene having from about 2 to about 20 carbon atoms, Li is a lithium atom bonded directly to a carbon atom of $R_2$; and $R_3$ is a tertiary amino, an alkyl having from about 1 to about 12 carbon atoms; an aryl having from about 6 to about 20 carbon atoms; an alkaryl having from about 7 to about 20 carbon atoms; an alkenyl having from about 2 to about 12 carbon atoms; a cycloalkyl having from about 5 to about 20 carbon atoms; a cycloalkenyl having from about 5 to about 20 carbon atoms; a bicycloalkyl having from about 6 to about 20 carbon atoms; and, a bicycloalkenyl having from about 6 to about 20 carbon atoms; where n is an integer of from 0 to about 10.

U.S. Pat. No. 6,084,025 discloses a functionalized polymer prepared by a process comprising the steps of: preparing a solution of a cyclic amine compound, an organolithium compound, and from 3 to about 300 equivalents, based upon one equivalent of lithium, of a monomer selected from vinyl aromatic monomers, and mixtures thereof, where said cyclic amine compound is defined by the formula

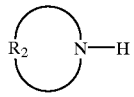

where $R_2$ is selected from the group consisting of an alkylene, substituted alkylene, bicycloalkane, and oxy- or N-alkylamino-alkylene group having from about 3 to about 16 methylene groups, N is a nitrogen atom, and H is a hydrogen atom, thereby forming a polymerization initiator having the formula $A(SOL)_yLi$, where Li is a lithium atom, SOL is a divalent hydrocarbon group having from 3 to about 300 polymerized monomeric units, y is from 0.5 to about 3, and A is a cyclic amine radical derived from said cyclic amine; charging the solution containing $A(SOL)_yLi$ with from about 0.01 to about 2 equivalents per equivalent of lithium of a chelating reagent, and an organic alkali metal compound selected from compounds having the formula $R_4OM$, $R_5C(O)OM$, $R_6R_7NM$, and $R_8SO_3M$, where $R_4$, $R_5$, $R_6$, $R_7$, and $R_8$ are each selected from alkyls, cycloalkyls, alkenyls, aryls, or phenyls, having from 1 to about 12 carbon atoms; and where M is Na, K, Rb or Cs, and sufficient monomer to form a living polymeric structure; and quenching the living polymeric structure.

In the initiator systems of U.S. Pat. No. 6,084,025 a chelating reagent can be employed to help prevent heterogeneous polymerization. The reagents that are reported as being useful include tetramethylethylenediamine (TMEDA), oxolanyl cyclic acetals, and cyclic oligomeric oxolanyl alkanes. The oligomeric oxolanyl alkanes may be represented by the structural formula:

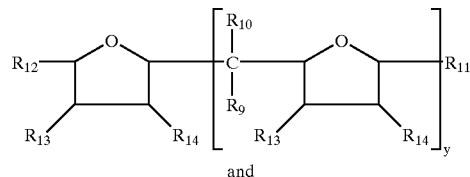

and

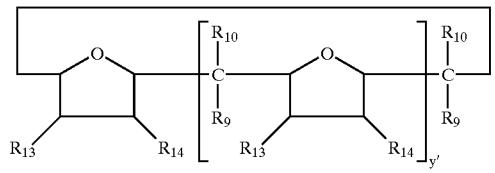

wherein $R_9$ and $R_{10}$ independently are hydrogen or an alkyl group and the total number of carbon atoms in —$CR_9R_{10}$- ranges between one and nine inclusive; y is an integer of 1 to 5 inclusive; y' is an integer of 3 to 5 inclusive; and $R_{11}$, $R_{12}$, $R_{13}$, and $R_{14}$ independently are —H or —$C_nH_{2n+1}$, wherein n=1 to 6.

In order to commercially produce large quantities of synthetic rubber at low cost it is normally necessary to make the rubber by a continuous polymerization process. It is also critical for a high level of monomer conversion to be attained for the continuous polymerization to be an efficient process. It is also, of course, important for the continuous polymerization to result in the production of a synthetic rubber having a relatively high molecular weight or Mooney viscosity.

SUMMARY OF THE INVENTION

The present invention is based upon the unexpected discovery that amino alkyl lithium initiators do not need to be synthesized and isolated prior to being utilized in synthesizing elastomers having low hysteresis and good compatibility with fillers. In the process of this invention, lithium initiators are made "in situ" in the polymerization zone rather than being synthesized and isolated prior to being used. For instance, the lithium initiator can be made "in situ" in the polymerization zone by continuously adding an organolithium compound and an amine compound to the polymerization zone. In the alternative, the organolithium compound and the amine compound can be mixed continuously in a feed line or static mixer immediately prior to being introduced into the polymerization reactor. In either case the organolithium compound and the amine compound react which results in the formation of the amino alkyl lithium initiator without a need for an isolation step.

The present invention more specifically discloses a process for synthesizing a rubbery polymer that comprises (1) continuously charging (a) a conjugated diolefin monomer, (b) an organolithium compound, and (c) an amine compound into a polymerization zone, wherein the amine compound is selected from the group consisting of alkyl, dialkyl, cycloalkyl or dicycloalkyl amine compounds of the general formula:

wherein R represents an alkyl group, a cycloalkyl group, or an alkaryl group containing from 1 to about 12 carbon atoms, and cyclic amine compounds of the general formula:

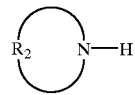

wherein $R_2$ represents a divalent alkylene, bicycloalkane, substituted alkylene, oxy- or N-alkylamino-alkylene group containing from about 3 to about 16 methylene groups; (2) allowing the conjugated diolefin monomer to polymerize in the polymerization zone to produce the rubbery polymer; and (3) continuously withdrawing the rubbery polymer from the polymerization zone.

DETAILED DESCRIPTION OF THE INVENTION

Virtually any type of rubbery polymer that is capable of being made by anionic polymerization can be synthesized by using the technique of this invention. The polymerization employed in synthesizing the rubbery polymers will normally be carried out in a hydrocarbon solvent. Such hydrocarbon solvents are comprised of one or more aromatic, paraffinic or cycloparaffinic compounds. These solvents will normally contain from about 4 to about 10 carbon atoms per molecule and will be liquid under the conditions of the polymerization. Some representative examples of suitable organic solvents include pentane, isooctane, cyclohexane, methylcyclohexane, isohexane, n-heptane, n-octane, n-hexane, benzene, toluene, xylene, ethylbenzene, diethylbenzene, isobutylbenzene, petroleum ether, kerosene, petroleum spirits, petroleum naphtha, and the like, alone or in admixture.

In the solution polymerization, there will normally be from 5 to 30 weight percent monomers in the polymerization medium. Such polymerization media are, of course, comprised of the organic solvent and monomers. In most cases, it will be preferred for the polymerization medium to contain from 10 to 25 weight percent monomers. It is generally more preferred for the polymerization medium to contain 15 to 20 weight percent monomers.

The synthetic rubbers made by the process of this invention can be made by the homopolymerization of a conjugated diolefin monomer or by the random copolymerization of a conjugated diolefin monomer with a vinyl aromatic monomer. It is, of course, also possible to make such rubbery polymers by polymerizing a mixture of conjugated diolefin monomers with one or more ethylenically unsaturated monomers, such as vinyl aromatic monomers. The conjugated diolefin monomers which can be utilized in the synthesis of rubbery polymers which can be coupled in accordance with this invention generally contain from 4 to 12 carbon atoms. Those containing from 4 to 8 carbon atoms are generally preferred for commercial purposes. For similar reasons, 1,3-butadiene and isoprene are the most commonly utilized conjugated diolefin monomers. Some additional conjugated diolefin monomers that can be utilized include 2,3-dimethyl-1,3-butadiene, piperylene, 3-butyl-1,3-octadiene, 2-phenyl-1,3-butadiene, and the like, alone or in admixture.

Some representative examples of ethylenically unsaturated monomers that can potentially be synthesized into rubbery polymers which can be coupled in accordance with this invention include alkyl acrylates, such as methyl acrylate, ethyl acrylate, butyl acrylate, methyl methacrylate and the like; vinylidene monomers having one or more terminal $CH_2=CH-$ groups; vinyl aromatics such as styrene, α-methylstyrene, bromostyrene, chlorostyrene, fluorostyrene and the like; α-olefins such as ethylene, propylene, 1-butene and the like; vinyl halides, such as vinylbromide, echloroethane (vinylchloride), vinylfluoride, vinyliodide, 1,2-dibromoethene, 1,1-dichloroethene (vinylidene chloride), 1,2-dichloroethene and the like; vinyl esters, such as vinyl acetate; α,β-olefinically unsaturated nitriles, such as acrylonitrile and methacrylonitrile; α,β-olefinically unsaturated amides, such as acrylamide, N-methyl acrylamide, N,N-dimethylacrylamide, methacrylamide and the like.

Rubbery polymers which are copolymers of one or more diene monomers with one or more other ethylenically unsaturated monomers will normally contain from about 50 weight percent to about 99 weight percent conjugated diolefin monomers and from about 1 weight percent to about 50 weight percent of the other ethylenically unsaturated monomers in addition to the conjugated diolefin monomers. For example, copolymers of conjugated diolefin monomers with vinylaromatic monomers, such as styrene-butadiene rubbers which contain from 50 to 95 weight percent conjugated diolefin monomers and from 5 to 50 weight percent vinylaromatic monomers, are useful in many applications.

Vinyl aromatic monomers are probably the most important group of ethylenically unsaturated monomers which are commonly incorporated into polydienes. Such vinyl aromatic monomers are, of course, selected so as to be copolymerizable with the conjugated diolefin monomers being utilized. Generally, any vinyl aromatic monomer which is known to polymerize with organolithium initiators can be used. Such vinyl aromatic monomers typically contain from 8 to 20 carbon atoms. Usually, the vinyl aromatic monomer will contain from 8 to 14 carbon atoms. The most widely used vinyl aromatic monomer is styrene. Some examples of vinyl aromatic monomers that can be utilized include styrene, 1-vinylnaphthalene, 2-vinylnaphthalene, α-methylstyrene, 4-phenylstyrene, 3-methylstyrene and the like.

Some representative examples of rubbery polymers that can be synthesized in accordance with this invention include polybutadiene, polyisoprene, styrene-butadiene rubber (SBR), α-methylstyrene-butadiene rubber, α-methylstyrene-isoprene rubber, styrene-isoprene-butadiene rubber (SIBR), styrene-isoprene rubber (SIR), isoprene-butadiene rubber (IBR), α-methylstyrene-isoprene-butadiene rubber and α-methylstyrene-styrene-isoprene-butadiene rubber. In cases where the rubbery polymer is comprised of repeat units that are derived from two or more monomers, the repeat units which are derived from the different monomers will normally be distributed in an essentially random manner. However, in other cases, tapered, segmented, or blocky polymers may be advantageous.

The rubbery polymer is made by continuously charging at least one conjugated diolefin monomer and any additional monomers into a polymerization zone. The polymerization zone will typically be a polymerization reactor or a series of polymerization reactors. The polymerization zone will normally provide agitation to keep the monomers, polymer, initiator, and modifier well dispersed throughout the organic solvent the polymerization zone. Such continuous polymerizations are typically conducted in a multiple reactor system. The rubbery polymer synthesized is continuously withdrawn from the polymerization zone. The monomer conversion attained in the polymerization zone will normally be at least about 85 percent. It is preferred for the monomer conversion to be at least about 90 percent.

The polymerization is initiated, at least in part, with an amino alkyl lithium initiator having a structural formula selected from the group consisting of:

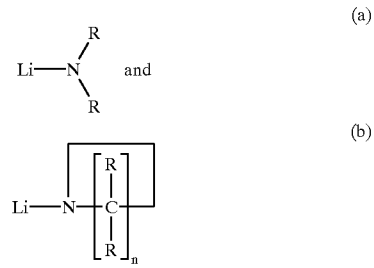

wherein R represents an alkyl group containing from 1 to about 8 carbon atoms, and wherein n represents an integer from 4 to about 20. It is typical for n to represents an integer from 4 to about 12. It is preferred for R to represent a hydrogen atom or an alkyl group containing from 1 to 4 carbon atoms. It is most preferred for R to represent hydrogen atoms. It is preferred for n to represent the integer 4 or an integer from 6 to about 8. It is most preferred from n to represent the integer 4 or the integer 6. Thus, the amino alkyl lithium will preferably be of the structural formula:

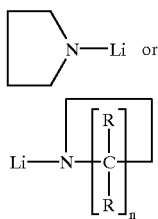

wherein n represents 6 and wherein R represents hydrogen atoms. However, it should be noted that lithium piperidide will initiate polymerization, but does not significantly improve the tread wear and rolling resistance of tires made with elastomers initiated therewith. It should also be appreciated that free organolithium compounds that have not reacted with an amine compound will normally initiate at least some portion of the polymerization. In this scenario not all of the polymer chains of the rubbery polymer will be functionalized. This does not significantly detract from the attributes of the rubber, such as its compatibility with fillers. This was a very unexpected finding.

A quantity of the amino alkyl lithium initiator is made "in situ" in the polymerization zone. This is done by continuously adding an organolithium compound and an amine compound to the polymerization zone which results in the formation of the amino alkyl lithium initiator which in turn immediately initiates the polymerization of diene monomers. In the alternative, the organolithium compound and an amine compound can be mixed in a feed line or a static mixer prior to being fed into the polymerization zone. A small amount of monomer (0.5 to 10 molar quantity) can be added to the amine compound to facilitate mixing. In any case the organolithium compound will typically be an alkyl lithium compound that contains from 1 to about 8 carbon atoms, such as n-butyl lithium, and the amine compound selected from the group consisting of alkyl, dialkyl, cycloalkyl or dicycloalkyl amine compounds of the general formula:

wherein R represents an alkyl group, a cycloalkyl group, or an alkaryl group containing from 1 to about 12 carbon atoms, and cyclic amine compounds of the general formula:

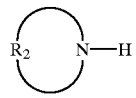

wherein $R_2$ represents a divalent alkylene, bicycloalkane, substituted alkylene, oxy- or N-alkylamino-alkylene group containing from about 3 to about 16 methylene groups. R will preferably contain from 1 to 4 carbon atoms. It is preferred for $R_2$ to represent a divalent alkylene group that contains 4 carbon atoms or for $R_2$ to represent a divalent alkylene group that contains 6 to about 12 carbon atoms. It is more preferred for $R_2$ to represent a divalent alkylene group that contains 4 carbon atoms or a divalent alkylene group that contains 6 carbon atoms.

The molar ratio of the amine compound to the organolithium compound will typically be within the range of about 0.2:1 to about 1.5:1. The molar ratio of the amine compound to the organolithium compound will more typically be within the range of about 0.4:1 to about 1.2:1. It is normally not desirable for the molar ratio of the amine compound to the organolithium compound to be greater than about 1:1. It is typically preferred for the molar ratio of the amine compound to the organolithium compound to be within the range of about 0.6:1 to about 1.1:1. It is more preferred for the molar ratio of the amine compound to the organolithium compound to be within the range of about 0.7:1 to about 1:1.

The amount of the lithium initiator utilized will vary with the monomers being polymerized and with the molecular weight that is desired for the polymer being synthesized. However, as a general rule, from 0.01 to 1 phm (parts per 100 parts by weight of monomer) of the lithium initiator will be utilized. In most cases, from 0.01 to 0.1 phm of the lithium initiator will be utilized with it being preferred to utilize 0.025 to 0.07 phm of the lithium initiator.

The polymerization process of this invention is normally conducted in the presence of polar modifiers, such as alkyltetrahydrofurfuryl ethers. Some representative examples of specific polar modifiers that can be used include methyltetrahydrofurfuryl ether, ethyltetrahydrofurfuryl ether, propyltetrahydrofurfuryl ether, butyltetrahydrofurfuryl ether, hexyltetrahydrofurfuryl ether, octyltetrahydrofurfuryl ether, dodecyltetrahydrofurfuryl ether, diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine, N-methyl morpholine, N-ethyl morpholine, or N-phenyl morpholine.

The polar modifier will typically be employed at a level wherein the molar ratio of the polar modifier to the lithium initiator is within the range of about 0.01:1 to about 5:1. The molar ratio of the polar modifier to the lithium initiator will more typically be within the range of about 0.1:1 to about 4:1. It is generally preferred for the molar ratio of polar modifier to the lithium initiator to be within the range of about 0.25:1 to about 3:1. It is generally most preferred for the molar ratio of polar modifier to the lithium initiator to be within the range of about 0.5:1 to about 3:2.

The polymerization can optionally be conducted utilizing an oligomeric oxolanyl alkane as the modifier. Such oligomeric oxolanyl alkanes will typically be of a structural formula selected from the group consisting of:

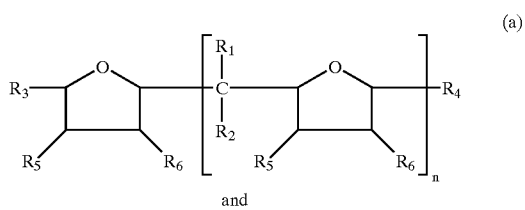

and

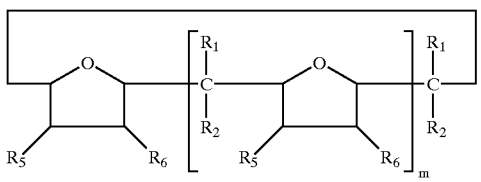

wherein n represents an integer from 1 to 5, wherein m represents an integer from 3 to 5, wherein $R_1$, $R_2$, $R_3$, $R_4$, $R_5$, and $R_6$ can be the same or different, and wherein $R_1$, $R_2$, $R_3$, $R_4$, $R_5$, and $R_6$ represent a member selected from the group consisting of hydrogen atoms and alkyl groups containing from 1 to about 8 carbon atoms. It is typically preferred for $R_1$, $R_2$, $R_3$, $R_4$, $R_5$, and $R_6$ represent a member selected from the group consisting of hydrogen atoms and alkyl groups containing from 1 to 4 carbon atoms.

The polymerization temperature utilized can vary over a broad range of from about −20° C. to about 180° C. In most cases, a polymerization temperature within the range of about 30° C. to about 125° C. will be utilized. It is typically preferred for the polymerization temperature to be within the range of about 45° C. to about 100° C. It is typically most preferred for the polymerization temperature to be within the range of about 60° C. to about 90° C. The pressure used will normally be sufficient to maintain a substantially liquid phase under the conditions of the polymerization reaction.

The polymerization is conducted for a length of time sufficient to permit substantially complete polymerization of monomers. In other words, the polymerization is normally carried out until high conversions of at least about 85 percent are attained. The polymerization is then terminated by the addition of an agent, such as an alcohol, a terminating agent, or a coupling agent. For example, a tin halide and/or silicon halide can be used as a coupling agent. The tin halide and/or the silicon halide are continuous added in cases where asymmetrical coupling is desired. This continuous addition of tin coupling agent and/or the silicon coupling agent is normally done in a reaction zone separate from the zone where the bulk of the polymerization is occurring. The coupling agents will normally be added in a separate reaction vessel after the desired degree of conversion has been attained. The coupling agents can be added in a hydrocarbon solution, e.g., in cyclohexane, to the polymerization admixture with suitable mixing for distribution and reaction. In other words, the coupling will typically be added only after a high degree of conversion has already been attained. For instance, the coupling agent will normally be added only after a monomer conversion of greater than about 85 percent has been realized. It will typically be preferred for the monomer conversion to reach at least about 90 percent before the coupling agent is added.

The tin halides used as coupling agents will normally be tin tetrahalides, such as tin tetrachloride, tin tetrabromide, tin tetrafluoride or tin tetraiodide. However, tin trihalides can also optionally be used. Polymers coupled with tin trihalides having a maximum of three arms. This is, of course, in contrast to polymers coupled with tin tetrahalides which have a maximum of four arms. To induce a higher level of branching, tin tetrahalides are normally preferred. As a general rule, tin tetrachloride is most preferred.

The silicon coupling agents that can be used will normally be silicon tetrahalides, such as silicon tetrachloride, silicon tetrabromide, silicon tetrafluoride or silicon tetraiodide. However, silicon trihalides can also optionally be used. Polymers coupled with silicon trihalides having a maximum of three arms. This is, of course, in contrast to polymers coupled with silicon tetrahalides which have a maximum of four arms. To induce a higher level of branching, silicon tetrahalides are normally preferred. As a general rule, silicon tetrachloride is most preferred of the silicon coupling agents.

A combination of a tin halide and a silicon halide can optionally be used to couple the rubbery polymer. By using such a combination of tin and silicon coupling agents improved properties for tire rubbers, such as lower hysteresis, can be attained. It is particularly desirable to utilize a combination of tin and silicon coupling agents in tire tread compounds that contain both silica and carbon black. In such cases, the molar ratio of the tin halide to the silicon halide employed in coupling the rubbery polymer will normally be within the range of 20:80 to 95:5. The molar ratio of the tin halide to the silicon halide employed in coupling the rubbery polymer will more typically be within the range of 40:60 to 90:10. The molar ratio of the tin halide to the silicon halide employed in coupling the rubbery polymer will preferably be within the range of 60:40 to 85:15. The molar ratio of the tin halide to the silicon halide employed in coupling the rubbery polymer will most preferably be within the range of 65:35 to 80:20.

Broadly, and exemplary, a range of about 0.01 to 4.5 milliequivalents of tin coupling agent (tin halide and silicon halide) is employed per 100 grams of the rubbery polymer. It is normally preferred to utilize about 0.01 to about 1.5 milliequivalents of the coupling agent per 100 grams of polymer to obtain the desired Mooney viscosity. The larger quantities tend to result in production of polymers containing terminally reactive groups or insufficient coupling. One equivalent of tin coupling agent per equivalent of lithium is considered an optimum amount for maximum branching. For instance, if a mixture tin tetrahalide and silicon tetrahalide is used as the coupling agent, one mole of the coupling agent would be utilized per four moles of live lithium ends. In cases where a mixture of tin trihalide and silicon trihalide is used as the coupling agent, one mole of the coupling agent will optimally be utilized for every three moles of live lithium ends. The coupling agent can be added in a hydrocarbon solution, e.g., in cyclohexane, to the polymerization admixture in the reactor with suitable mixing for distribution and reaction.

After the coupling has been completed, a tertiary chelating alkyl 1,2-ethylene diamine or a metal salt of a cyclic alcohol can optionally be added to the polymer cement to stabilize the coupled rubbery polymer. The tertiary chelating amines that can be used are normally chelating alkyl diamines of the structural formula:

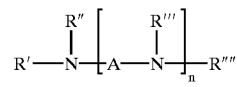

wherein n represents an integer from 1 to about 6, wherein A represents an alkylene group containing from 1 to about 6 carbon atoms and wherein R', R'', R''' and R'''' can be the same or different and represent alkyl groups containing from 1 to about 6 carbon atoms. The alkylene group A is of the formula $-(-CH_2-)_m$ wherein m is an integer from 1 to about 6. The alkylene group will typically contain from 1 to 4 carbon atoms (m will be 1 to 4) and will preferably contain 2 carbon atoms. In most cases, n will be an integer from 1 to about 3 with it being preferred for n to be 1. It is preferred for R', R:'', R''' and R'''' to represent alkyl groups which contain from 1 to 3 carbon atoms. In most cases, R', R'', R''' and R'''' will represent methyl groups.

In most cases, from about 0.01 phr (parts by weight per 100 parts by weight of dry rubber) to about 2 phr of the chelating alkyl 1,2-ethylene diamine or metal salt of the cyclic alcohol will be added to the polymer cement to stabilize the rubbery polymer. Typically, from about 0.05 phr to about 1 phr of the chelating alkyl 1,2-ethylene diamine or metal salt of the cyclic alcohol will be added. More typically, from about 0.1 phr to about 0.6 phr of the chelating alkyl 1,2-ethylene diamine or the metal salt of the cyclic alcohol will be added to the polymer cement to stabilize the rubbery polymer.

The terminating agents that can be used to stop the polymerization and to "terminate" the living rubbery polymer include tin monohalides, silicon monohalides, N,N,N', N'-tetradialkyldiamino-benzophenones (such as tetramethyldiaminobenzophenone and the like), N,N-dialkylaminobenzaldehydes (such as dimethylaminobenzaldehyde and the like), 1,3-dialkyl-2-imidazolidinones (such as 1,3-dimethyl-2-imidazolidinone and the like), 1-alkyl substituted pyrrolidinones; 1-aryl substituted pyrrolidinones, dialkyl-dicycloalkyl-carbodiimides containing from about 5 to about 20 carbon atoms, and dicycloalkyl-carbodiimides containing from about 5 to about 20 carbon atoms.

After the termination step, and optionally the stabilization step, has been completed, the rubbery polymer can be recovered from the organic solvent. The coupled rubbery polymer can be recovered from the organic solvent and residue by means such as chemical (alcohol) coagulation, thermal desolventization, or other suitable method. For instance, it is often desirable to precipitate the rubbery polymer from the organic solvent by the addition of lower alcohols containing from about 1 to about 4 carbon atoms to the polymer solution. Suitable lower alcohols for precipitation of the rubber from the polymer cement include methanol, ethanol, isopropyl alcohol, normal-propyl alcohol and t-butyl alcohol. The utilization of lower alcohols to precipitate the rubbery polymer from the polymer cement also "terminates" any remaining living polymer by inactivating lithium end groups. After the coupled rubbery polymer is recovered from the solution, steam-stripping can be employed to reduce the level of volatile organic compounds in the coupled rubbery polymer. Additionally, the organic solvent can be removed from the rubbery polymer by drum drying, extruder drying, vacuum drying, and the like.

The polymers of the present invention can be used alone or in combination with other elastomers to prepare an rubber compounds, such as a tire treadstock, sidewall stock or other tire component stock compounds. In a tire of the invention, at least one such component is produced from a vulcanizable elastomeric or rubber composition. For example, the rubbery polymer made by the process of this invention can be blended with any conventionally employed treadstock rubber which includes natural rubber, synthetic rubber and blends thereof. Such rubbers are well known to those skilled in the art and include synthetic polyisoprene rubber, styrene/butadiene rubber (SBR), polybutadiene, butyl rubber, Neoprene, ethylene/propylene rubber, ethylene/propylene/diene rubber (EPDM), acrylonitrile/butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene/propylene rubber and the like.

When the rubbery polymers made by the process of the present invention are blended with conventional rubbers, the amounts can vary widely such as between 10 and 99 percent by weight. In any case, tires made with synthetic rubbers that are synthesized utilizing the technique of this invention exhibit decreased rolling resistance. The greatest benefits are realized in cases where the tire tread compound is made with the rubbery polymer synthesized utilizing the technique of this invention. However, benefits can also by attained in cases where at least one structural element of the tire, such as subtread, sidewalls, body ply skim, or bead filler, is comprised of the rubbery.

The synthetic rubbers made in accordance with this invention can be compounded with carbon black in amounts ranging from about 5 to about 100 phr (parts by weight per 100 parts by weight of rubber), with about 5 to about 80 phr being preferred, and with about 40 to about 70 phr being more preferred. The carbon blacks may include any of the commonly available, commercially-produced carbon blacks but those having a surface area (EMSA) of at least 20 $m^2/g$ and more preferably at least 35 $m^2/g$ up to 200 $m^2/g$ or higher are preferred. Surface area values used in this application are those determined by ASTM test D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks. Mixtures of two or more of the above blacks can be used in preparing the carbon black products of the invention. Typical values for surface areas of usable carbon blacks are summarized in Table I.

TABLE I

| Carbon Black | |
|---|---|
| ASTM Designation (D-1765-82a) | Surface Area (D-3765) |
| N-110 | 126 $m^2/g$ |
| N-220 | 111 $m^2/g$ |
| N-330 | 83 $m^2/g$ |
| N-339 | 95 $m^2/g$ |
| N-550 | 42 $m^2/g$ |
| N-660 | 35 $m^2/g$ |

The carbon blacks utilized in the preparation of rubber compounds may be in pelletized form or an unpelletized flocculent mass. Preferably, for more uniform mixing, unpelletized carbon black is preferred. The reinforced rubber compounds can be cured in a conventional manner with about 0.5 to about 4 phr of known vulcanizing agents. For example, sulfur or peroxide-based curing systems may be employed. For a general disclosure of suitable vulcanizing agents one can refer to Kirk-Othmer, Encyclopedia of Chemical Technology, 3rd ed., Wiley Interscience, N.Y. 1982, Vol. 20, pp. 365–468, particularly "Vulcanization Agents and Auxiliary Materials" pp. 390–402. Vulcanizing agents can, of curse, be used alone or in combination. Vulcanizable elastomeric or rubber compositions can be prepared by compounding or mixing the polymers thereof with carbon black and other conventional rubber additives such as fillers, plasticizers, antioxidants, curing agents and the like, using standard rubber mixing equipment and procedures and conventional amounts of such additives.

This invention is illustrated by the following examples that are merely for the purpose of illustration and are not to be regarded as limiting the scope of the invention or the manner in which it can be practiced. Unless specifically indicated otherwise, all parts and percentages are given by weight.

EXAMPLE 1

In this experiment, a pyrrolidine functionalized styrene-butadiene rubber (SBR) was prepared from a catalyst system consisting of n-butyl lithium and pyrrolidine. In the procedure utilized 2,300 grams of a silica/alumina/molecular sieve dried premix containing 20.0 weight percent of a styrene/1,3-butadiene mixture in hexanes was charged into a one-gallon (3.8 liter) reactor. The ratio of styrene to 1,3-butadiene was 15:85. After determining the impurity level of the premix, 4.6 ml of 0.5 M solution pyrrolidine (in hexane) and 2.45 ml of 1.03 M n-butyl lithium (in hexanes; 0.25 ml was for scavenging the premix and 2.2 ml was for initiation) were added to the reactor containing stirred premix. After about 2 minutes, 2.3 ml of a 1.0 M solution of TMEDA (N, N, N', N'- tetramethylethylene diamine in hexanes) was added to the reactor. The molar ratio of TMEDA to n-butyl lithium (n-BuLi) was 1:1.

The polymerization was carried out at 75° C. for 2 hours. The GC analysis of the residual monomers contained in the polymerization mixture indicated that the all monomers were converted to polymer. The polymer cement was removed from the reactor and then shortstopped with ethanol and stablized with 1 phm of antioxidant. After evaporating the hexanes solvent, the resulting polymer was dried in a vaccum oven at 50° C.

The pyrrolidine functionalized SBR produced was determined to have a glass transition temperature (Tg) at −40° C. It was also determined to have a microstructure which contained 47.3 percent 1,2-polybutadiene units, 36.8 percent 1,4-polybutadiene units and 15.9 percent random polystyrene. The Mooney viscosity (ML-4) at 100° C. for this polymer was also determined to be 63.

COMPARATIVE EXAMPLE 2

In this example, a pyrrolidine functionalized 15/85 SBR was prepared using a preformed pyrrolidino lithium catalyst in heanxe. The preformed catalyst was prepared by reacting pyrrolidine with equal molar quantity of n-BuLi and two molar quantity of terahydrofuran in hexane. The procedure described in Example 1 was then utilized except that a preformed pyrrolidino lithium was used instead of n-BuLi and pyrrolidine as the initiaor. The pyrrolidine functionalized SBR produced was determined to have a glass transition temperature (Tg) at −41° C. It was also determined to have a microstructure which contained 47.1 percent 1,2-polybutadiene units, 36.7 percent 1,4-polybutadiene units and 16.2 percent random polystyrene. The Mooney viscosity (ML-4) at 100° C. for this polymer was also determined to be 63.

EXAMPLE 3

In this example, a HMI (hexamethyleneimine) functionalized 15/85 SBR was prepared. The procedure used in Example 1 was utilized except that HMI was used in place of pyrrolidine as the functionalization agent. The HMI functionalized SBR produced was determined to have a glass transition temperature (Tg) at −42° C. It was also determined to have a microstructure which contained 48.0 percent 1,2-polybutadiene units, 36.1 percent 1,4-polybutadiene units and 15.9 percent random polystyrene. The Mooney viscosity (ML-4) at 100° C. for this polymer was also determined to be 63.

COMPARATIVE EXAMPLE 4

In this example, a HMI functionalized 15/85 SBR was prepared using a preformed hexamethyleneimino lithium catalyst in heanxe. The preformed catalyst was prepared by reacting HMI with equal molar quantity of n-BuLi and two molar quantity of terahydrofuran in hexane. The procedure described in Example 1 was utilized except that a preformed hexamethyleneimino lithium was used instead of n-BuLi and HMI as the initiaor. The HMI functionalized SBR produced was determined to have a glass transition temperature (Tg) at −42° C. It was also determined to have a microstructure which contained 48.1 percent 1,2-polybutadiene units, 35.8 percent 1,4-polybutadiene units and 16.2 percent random polystyrene. The Mooney viscosity (ML-4) at 100° C. for this polymer was also determined to be 61.

COMPARATIVE EXAMPLE 5

In this example, a non-functionalized control SBR was prepared. The procedure described in Example 1 was utilized in this example except that no pyrrolidine was used. The non-functionalized 15/85 SBR produced was determined to have a glass transition temperature (Tg) at −42° C. It was also determined to have a microstructure which contained 46.8 percent 1,2-polybutadiene units, 37.2 percent 1,4-polybutadiene units and 16.1 percent random polystyrene. The Mooney viscosity (ML-4) at 100° C. for this polymer was also determined to be 63.

EXAMPLE 6

In this example, a tin coupled HMI functionalized 15/85 SBR was prepared. 2,300 g of a silica/alumina/molecular sieve dried premix containing 20.0 weight percent of styrene/1,3-butadiene mixture in hexanes was charged into a one-gallon (3.8 liters) reactor. The ratio of styrene to 1,3-butadiene was 15:85. After determining the impurity level of the premix, 4.6 ml of 1.0 M solution HMI (in hexanes) and 4.65 ml of 1.03 M n-BuLi (in hexanes; 0.25 ml was for scavenging the premix and 4.4 ml. was for initiation) was added to the reactor containing stirred premix. After about 2 minutes, 4.4 ml of a 1.0 M solution of TMEDA (in hexanes) was added to the reactor. The molar ratio of TMEDA to n-BuLi was 1:1.

The polymerization was carried out at 75° C. for 1.5 hours. The GC analysis of the residual monomers contained in the polymerization mixture indicated that the all monomers were converted to polymer. A small portion of the polymer cement (about 200 grams) was removed from the reactor and shortstopped with ethanol and stablized with 1 phm of antioxidant. It was the base polymer prior to coupling reaction. 1.3 ml of 0.88 M tin tetrachloride solution (in hexanes) was then added to the remaining cement in the reactor. The coupling reaction was proceeded at the same temperature for 30 minutes. The resulting polymer cement was then stabilized with an antioxidant and TMEDA. After evaporating hexanes, the recovered tin coupled polymer was dried in a vaccum oven at 50° C.

The tin coupled HMI functionalized SBR produced was determined to have a glass transition temperature (Tg) at −43° C. It was also determined to have a microstructure which contained 45.7 percent 1,2-polybutadiene units, 38.0 percent 1,4-polybutadiene units and 16.3 percent random polystyrene. The Mooney ML-4 viscosity at 100° C. for this polymer was also determined to be 63. The uncoupled base polymer was determined to have a Mooney ML-4 viscosity at 100° C. of 11.

EXAMPLE 7

In this experiment, a pyrrolidine functionalized styrene-butadiene rubber (SBR) was prepared. In the procedure utilized 22,500 g of a silica/alumina/molecular sieve dried premix containing 18.0 weight percent of a styrene/1,3-butadiene mixture in hexanes was charged into a ten-gallon (38 liter) reactor. The ratio of styrene to 1,3-butadiene was 15:85. After determining the impurity level of the premix, 1.6 ml of freshly distilled pyrrolindine and 14.0 ml of 1.6 M n-BuLi (in hexanes; 1.3 ml was for scavenging the premix and 12.7 ml. was for initiation) were added to the reactor containing stirred premix. After about 2 minutes, 10.1 ml of a 2.0 M solution of TMEDA (in hexanes) was added to the reactor. The molar ratio of TMEDA to n-BuLi was 1:1.

The polymerization was carried out at 75° C. for 2 hours. The GC analysis of the residual monomers contained in the polymerization mixture indicated that the all monomers were converted to polymer. One half (11,250 grams) of the polymer cement was removed from the reactor and then shortstopped with ethanol and stablized with 1 phm of antioxidant. The other half of the polymer cement was left in the reactor for making the difunctionalized SBR in Example 2. After evaporating hexanes, the resulting polymer obtained form the first half of the cement was dried in a vaccum oven at 50° C.

The pyrrolidine functionalized SBR produced was determined to have a glass transition temperature (Tg) at –47° C. It was also determined to have a microstructure which contained 41.7 percent 1,2-polybutadiene units, 42.7 percent 1,4-polybutadiene units and 15.6 percent random polystyrene. The Mooney ML-4 viscosity at 100° C. for this polymer was also determined to be 53.

EXAMPLE 8

In this example, a di-functionalized (telechelic) SBR having pyrrolidine (Pyr) at the beginning of the chain and tributyltin ($Bu_3Sn$) group at the end of polymer chain was prepared. In the procedure used 10.1 ml of a 1 M tributyltin chloride solution (in hexanes) was added to a ten gallon reactor (38 liter) containing 11,250 grams of live pyrrolidine functionalized SBR cement, obtained as described in Example 7, at 75° C. The polymerization mixture was stirred for 30 minutes and the resulting cement was worked up as described in Example 1. The di-functionalized SBR, Pyr-SBR-$SnBu_3$, produced was determined to have a glass transition temperature (Tg) at –47° C. It was also determined to have a microstructure which contained 41.6 percent 1,2-polybutadiene units, 42.9 percent 1,4-polybutadiene units and 15.5 percent random polystyrene. The Mooney viscosity (ML-4) at 100° C. for this polymer was also determined to be 53.

EXAMPLE 9

In this example, a HMI (hexamethyleneimine) funcfionalized 15/85 SBR was prepared. The procedure used in Example 7 was utilized except that HMI was used in place of pyrrolidine as the functionalization agent. The HMI functionalized SBR produced was determined to have a glass transition temperature (Tg) at –45° C. It was also determined to have a microstructure which contained 44.4 percent 1,2-polybutadiene units, 39.2 percent 1,4-polybutadiene units and 16.4 percent random polystyrene. The Mooney viscosity (ML-4) at 100° C. for this polymer was also determined to be 53.

EXAMPLE 10

In this example, a di-functionalized (telechelic) SBR having HMI at the beginning of the chain and tributyltin ($Bu_3Sn$) group at the end of polymer chain was prepared. The procedure used in Example 8 was utilized except that live HMI functionalized SBR cement was obtained from Example 9. The di-functionalized SBR, HMI-SBR-$SnBu_3$, produced was determined to have a glass transition temperature (Tg) at –45° C. It was also determined to have a microstructure which contained 43.9 percent 1,2-polybutadiene units, 39.9 percent 1,4-polybutadiene units and 16.2 percent random polystyrene. The Mooney viscosity (ML-4) at 100° C. for this polymer was also determined to be 53.

COMPARATIVE EXAMPLE 11

In this example, a non-functionalized control SBR was prepared. The procedure described in Example 7 was utilized in these examples except that no pyrrolidine was used. The non-functionalized 15/85 SBR produced was determined to have a glass transition temperature (Tg) at –48° C. It was also determined to have a microstructure which contained 43.6 percent 1,2-polybutadiene units, 41.9 percent 1,4-polybutadiene units and 14.4 percent random polystyrene. The Mooney viscosity (ML-4) at 100° C. for this polymer was also determined to be 61.

EXAMPLE 12

In this experiment, a HMI functionalized high vinyl polybutadiene (HVPBD) was prepared. 22,000 g of a silica/alumina/molecular sieve dried premix containing 18.0 weight percent 1,3-butadiene mixture in hexanes was charged into a ten-gallon (38 liter) reactor. After determining the impurity level of the premix, 2.2 ml of freshly distilled HMI and 15.0 ml of 1.6 M n-BuLi (in hexanes; 2.3 ml was for scavenging the premix and 12.7 ml. was for initiation) was added to the reactor containing stirred premix. After about 2 minutes, 6.1 ml of a neat TMEDA and 10.1 ml of 1 M sodium mentholate (SMT) solution (in hexanes) were added to the reactor. The molar ratio of SMT to TMEDA and to n-BuLi was 0.5:2:1. The polymerization was carried out at 65° C. for 1 hour. The GC analysis of the residual monomer contained in the polymerization mixture indicated that the all monomer was consumed. One half (11,000 grams) of the polymer cement was removed from the reactor and then shortstopped with ethanol and stablized with 1 phm of antioxidant. The other half of the polymer cement was left in the reactor for making the difunctionalized HVPBD in Example 13. After evaporating hexanes, the resulting polymer obtained form the first half of the cement was dried in a vaccum oven at 50° C.

The HMI functionalized HVPBD produced was determined to have a glass transition temperature (Tg) at –29° C. It was also determined to have a microstructure which contained 82.3 percent 1,2-polybutadiene units and 17.7 percent 1,4-polybutadiene units. The Mooney viscosity (ML-4) at 100° C. for this polymer was also determined to be 62.

EXAMPLE 13

In this example, a di-functionalized (telechelic) HVPBD having HMI at the beginning of the chain and tributyltin ($Bu_3Sn$) group at the end of polymer chain was prepared. In the procedure employed 10.1 ml of a 1 M tributyltin chloride solution (in hexanes) was added to a ten gallon reactor containing 11,000 grams of live HMI-HVPBD cement, obtained as described in Example 12, at 65° C. The polymerization mixture was stirred for 30 minutes and the resulting cement was worked up as described in Example 7.

The di-functionalized HVPBD, HMI-HVPBD-SnBu$_3$, produced was determined to have a glass transition temperature (Tg) at −29° C. It was also determined to have a microstructure which contained 82.0 percent 1,2-polybutadiene units and 18.0 percent 1,4-polybutadiene units. The Mooney viscosity (ML-4) at 100° C. for this polymer was also determined to be 59.

COMPARATIVE EXAMPLE 14

In this example, a non-functionalized control HVPBD was prepared. The procedure described in Example 12 was utilized in this example except that no HMI was used. The non-functionalized HVPBD produced was determined to have a glass transition temperature (Tg) at −29° C. It was also determined to have a microstructure which contained 82.2 percent 1,2-polybutadiene units and 17.8 percent 1,4-polybutadiene units. The Mooney viscosity (ML-4) at 100° C. for this polymer was also determined to be 65.

EXAMPLE 15

In this example, a pyrrolidine functionalized 15/85 SBR was synthesized continuously at 80° C. in a three-reactor system that was comprised of one 1-gallon (3.785 liter) reactor and two 2-gallon (7.571 liter) reactors. A premix containing 15 weight percent styrene and 1,3-butadiene in hexanes was charged into the first reactor continuously at a rate of 117 gram/minute. The ratio of styrene to 1,3-butadiene was 15:85. Polymerization was initiated by adding a 0.128 M solution of n-butyl lithium (in hexanes) at a rate of 1.70 grams/minute, a 0.20 M solution of pyrrolidine solution (in hexanes) at a rate of 0.98 grams/ minute and a 0.2 M solution of TMEDA (in hexane) at a rate of 1.50 grams/minute into the first reactor. Most of monomers were exhausted at the end of second reactor and the polymerization medium was continuously pushed over the third reactor containing a shortstop and an antioxidant. The total residence time was about 3 hours. The resulting polymer cement was then steam stripped and the pyrrolidine functionalized SBR recovered was dried in an oven at 60° C. The polymer was determined to have a glass transition temperature at −45° C. and have a Mooney viscosity (ML-4) at 100° C. of 51. It was also determined to have microstructure which contained 44 percent 1,2-polybutadiene units, 40 percent 1,4-polybutadiene units and 16 percent random polystyrene.

EXAMPLE 16

In this example, a pyrrolidine functionalized 15/85 SBR was prepared. The procedure decribed in Example 15 was utilized except that feeding lines of pyrrolidine, TMEDA and n-BuLi were brought together right before entering the first reactor. All physical characteristics of the resulting pyrrolidine functionalized SBR (Tg, ML-4 and microstructure) were similar to the polymer parepared in Example 15.

EXAMPLE 17

In this example, a pyrrolidine functionalized 15/85 SBR was prepared. The procedure decribed in Example 16 was utilized except that pyrrolidine was pre-mixed with a 1:4 molar ratio of styrene/1,3-butadiene premix. Again, the physical characteristics of the resulting pyrrolidine functionalized SBR (Tg, ML-4 and microstructure) were similar to the polymer parepared in Example 15.

EXAMPLE 18

In this example, a HMI functionalized 15/85 SBR was prepared. The procedure described in Example 16 was utilized except that HMI was used in place of pyrrolidine. The polymer was determined to have a glass transition temperature at −44° C. and have a Mooney viscosity (ML-4) at 100° C. of 61. It was also determined to have microstructure which contained 45 percent 1,2-polybutadiene units, 40 percent 1,4-polybutadiene units and 15 percent random polystyrene.

EXAMPLE 19

The SBRs made in Examples 1–5 were compounded in a model formulation by mixing them with the ingredients shown in Table I. As indicated in Table II, all amine functionalized SBRs (Examples 1–4) exhibited similar tan delta values (0.91–0.98) at 11 Hz, 10% strain and 100° C. These values were much lower than that of the non-functionalized control SBR (Example 5) indicating that all these amine functionalized SBRs will have much lower hysteresis when used as a tire tread compounds. It was also unexpectedly found that the compound properties for these amine functionalized polymers were similar whether they were prepared by a preformed N-lithio initiator or by a much simpler system consisting of n-BuLi and amine.

TABLE I

| Materials | phr |
|---|---|
| SBR | 80 |
| 1,4-IR | 20 |
| carbon black | 45 |
| process oil | 5 |
| wax | 2.5 |
| stearic acid | 1 |
| zinc oxide | 1.5 |
| antioxidant | 1 |
| accelerator | 0.5 |
| curative | 1 |
| sulfur | 1 |

TABLE II

| | Tan Delta Values | | | | |
|---|---|---|---|---|---|
| Example | 1 | 2 | 3 | 4 | 5 |
| Polymer | Pyr-SBR | Pyr-SBR | HMI-SBR | HMI-SBR | SBR* |
| Catalyst system | Pyr + n-BuLi | Pyr-Li | HMI + n-BuLi | HMI-Li | n-BuLi |
| Tg (° C.) | −40 | −41 | −42 | −42 | −42 |
| ML-4 at 100° C. | 63 | 63 | 63 | 61 | 63 |
| Tan Delta (100° C.) | 0.097 | 0.098 | 0.098 | 0.091 | 0.136 |

*Control

EXAMPLE 20

The SBRs made in Examples 7–11 were compounded in a model formulation by mixing them with the ingredients shown in Table I. As indicated in Table III, all amine functionalized SBRs (Examples 7 and 9) exhibited lower tan delta values at 11 Hz, 10% strain and 100° C. than the control non-functionalized SBR (Example 11). However, the di-functionalized SBRs (Examples 8 and 10) containing both amine and tributyltine functional groups showed the lowest tan delta values. This indicated that all these functionalized SBRs will have lower hysteresis when used as a tire tread compounds.

TABLE III

Rebound, Tan Delta, and Bound Rubber Values

| Example | 7 | 8 | 9 | 10 | 11 |
|---|---|---|---|---|---|
| Polymer | Pyr-SBR | Pyr-SBR-SnBu3 | HMI-SBR | HMI-SBR-SnBu3 | SBR* |
| Tg (° C.) | −47 | −47 | −45 | −45 | −48 |
| ML-4 at 100° C. | 53 | 53 | 53 | 53 | 59 |
| % Rebound (RT) | 52.9 | 55.7 | 55.7 | 56.6 | 49.3 |
| % Rebound (100° C.) | 67.1 | 68.5 | 68.0 | 69.8 | 62.7 |
| Tan Delta (100° C.) | 0.116 | 0.103 | 0.107 | 0.098 | 0.135 |
| % Bound Rubber | 38 | 45 | 40 | 46 | 30 |

*Control

EXAMPLE 21

The HVPBDs made in Examples 12–14 were compounded in a model formulation by mixing them with the ingredients shown in Table I. As indicated in Table IV, all amine functionalized HVPBDs (Examples 7 and 9) exhibited lower tan delta values at 11 Hz, 10% strain and 100° C. than the control non-functionalized HVPBD (Example 14). This indicated that all these functionalized HVPBDs will have lower hysteresis when used as a tire tread compounds.

TABLE IV

Rebound and Tan Delta Values

| Example | 12 | 13 | 14 |
|---|---|---|---|
| Polymer | HMI-HVPBD | HMI-HVPBD-SnBu3 | Control-HVPBD |
| Tg(° C.) | −29 | −29 | −29 |
| ML-4 at 100° C. | 62 | 62 | 65 |
| % Rebound (RT) | 51.0 | 51.8 | 46.1 |
| % Rebound (100° C.) | 68.3 | 68.8 | 46.1 |
| Tan Delta (100° C.) | 0.117 | 0.110 | 0.133 |

EXAMPLE 22

In this experiment styrene-butadiene rubber (SBR) was synthesized by a continuous polymerization process that was initiated with a lithium amide initiator. The procedure used evaluated hexyltetrahydrofurfuryl ether (HTE) and di-tetrahydrofurfurylpropane (DTP) as modifiers in a continuous system that included two polymerization reactors and a mixing vessel. The first reactor had a capacity of 1 gallon (3.785 liters) and the second reactor had a capacity of 2 gallons (7.571 liters). In the procedure used a monomer premix solution containing 15 weight percent monomers was charged through a drying bed and then into the first reactor. The monomer premix solution contained 14 weight percent styrene, 86 weight percent 1,3-butadiene, and 100 ppm (parts per million) of 1,2-butadiene as a gel inhibitor. The two-reactor chain was operated in a manner that attained a total residence time of 2¼ hours with the reaction temperature being maintained at 90° C. After the 2¼ hours of polymerization time the polymer cement containing the living SBR was continuously withdrawn from the second reactor and introduced into the mixer where the polymerization was terminated and the SBR was stabilized by the addition of Wingstay® 100 antioxidant. Initially, n-butyl lithium (n-BuLi) and HTE were mixed before entering the first reactor. The n-butyl lithium was initially employed at a level of 0.54 moles per 100 grams of monomer and the HTE was employed at a level of 2.137 moles per mole of n-butyl lithium. After about 15–20 hours of run time the monomer conversion out of the second reactor stabilized at a level of greater than 90 percent.

After 36 hours of run time HMI was mixed into the modifier stream and was then introduced into the n-butyl lithium. The molar ratio of HMI to n-butyl lithium was 1.05. The level of n-butyl lithium was adjusted to 0.64 moles per 100 grams of monomer with the HTE being employed at a level of 2.137 moles per mole of n-butyl lithium. The polymerization temperature was maintained at 90° C. and the residence time in the two reactor system was also maintained at 2¼ hours. The Mooney viscosity of the SBR began to rise, so the level of primary initiator was increased from 0.64 moles per 100 grams of monomer to 0.67 moles per 100 grams of monomer. However, after 45 hours of run time the level of primary initiator was adjusted back to 64 moles per 100 grams of monomer. After 48 hours of run time the level of HMI was decreased to a level of 0.95 moles per mole of n-butyl lithium. This adjustment did not increase the level of monomer conversion significantly. During this segment of the run which was carried out using HTE, the monomer conversion (out of the second reactor) was less than 85 percent.

After 54 hours of run time pyrrolidide was put on-line in place of the HMI initiator. The primary initiator level was decreased after 66 hours of run time in an attempt to raise the Mooney viscosity of the SBR. However, the Mooney ML 1+4 viscosity of the SBR remained below about 55 with it having a weight average molecular weight ($M_w$) of less than 300,000. Since relatively low monomer conversions (about 85 93–88 percent) were also attained the next phase of the evaluation was started after about 74 hours of run time.

In the next phase of the experiment, styrene was added (off the secondary initiator scale) just below the first reactor at a ratio of styrene to n-butyl lithium of 2:1. The styrene appeared to have no beneficial effect on the continuous polymerization system. In fact, it may have caused a slight drop in monomer conversion out of the first and second reactors. After 84 hours of run time the level of primary initiator was reduced from 0.58 moles per 100 grams of monomer to a level of 0.55 moles per 100 grams of monomer. Since this adjustment did not result in an increased level of monomer conversion the styrene was taken off-line after 86 hours of run time.

After the styrene was taken off line, the modifier was switched from HTE to DTP. This resulted in a substantial increase in the monomer conversion and Mooney viscosity of the SBR. In fact, monomer conversions (out of the second reactor) of about 90 percent were attained over the 14 hours that this segment of the experiment was carried out (100 hours of total run time). Accordingly, this experiment shows that DTP could be used without having a detrimental effect on monomer conversions or the molecular weight of the rubbery polymer produced.

It should be noted that DTP can be used to successfully stabilize the head groups of both lithium-HMI and lithium-pyrrolidide initiated polymers. It should be further noted that measures should be taken to insure that poisons are eliminated from the DTP. For instance, the DTP can be passed through a silica gel column to eliminate poisons to maintain higher levels of monomer conversion. By virtue of the fact that DTP is highly efficient, a lower ratio of DTP modifier to lithium can also normally be used than is required with other modifiers.

COMPARATIVE EXAMPLE 23

In this experiment styrene-butadiene rubber (SBR) was synthesized by a continuous polymerization process that was initiated with a lithium initiator system. The procedure used evaluated tetramethylethylenediamine (TMEDA) as a modifier in a continuous system that included two polymerization reactors and a mixing vessel. The first reactor had a capacity of 1 gallon (3.785 liters) and the second reactor had a capacity of 2 gallons (7.571 liters). In the procedure used a monomer premix solution containing 15 weight percent monomers was charged through a drying bed and then into the first reactor. The monomer premix solution contained 14 weight percent styrene, 86 weight percent 1,3-butadiene, and 100 ppm (parts per million) of 1,2-butadiene as a gel inhibitor. The two-reactor chain was operated in a manner that attained a total residence time of 2¼ hours with the reaction temperature being maintained at 90° C. After the 2¼ hours of polymerization time the polymer cement containing the living SBR was continuously withdrawn from the second reactor and introduced into the mixer where the polymerization was terminated and the SBR was stabilized by the addition of Wingstay® 100 antioxidant. Initially, n-butyl lithium (n-BuLi) and TMEDA were mixed before entering the first reactor. The n-butyl lithium was initially employed at a level of 0.54 moles per 100 grams of monomer and the TMEDA was employed at a level of 1.8 moles per mole of n-butyl lithium. Monomer conversions increased steadily from the beginning of the run and were at 83 percent after 4 hours. Monomer conversion ultimately increased to greater than 90 percent. After about 15–20 hours of run time the monomer conversion out of the second reactor stabilized at a level of greater than 90 percent.

After about 34 hours of run time HMI was mixed into the TMEDA modifier stream and was then introduced into the n-butyl lithium. The molar ratio of HMI to n-butyl lithium was 1.05. After 40 hours of run time TMEDA modifier level was increased to a level of 2.2 moles per mole of n-butyl lithium and the reactor temperature were increased to 95° C. The residence time in the two-reactor system was maintained at 2¼ hours. After 48 hours of run time the level of HMI was adjusted to 0.95 moles per mole of lithium and then a 50 hours of run time the level of HMI was adjusted to 0.90 moles per mole of lithium. However, monomer conversions remained low, so at 60 hours of run time, the reactor temperature was lowered to 75° C. and the TMEDA modifier level was adjusted back to 1.8 moles per mole of lithium. These adjustments did not increase the level of monomer conversion. After 74 hours of run time the primary monomer flow rate was slowed from 59.24 grams per minute to 50.35 grams per minute. The HMI level was also lowered to 0.8 moles per mole of lithium after a run time of 84 hours. During this second segment of the run which was carried out using TMEDA as a modifier, the monomer conversion (out of the second reactor) was less than 80 percent. This experiment again shows that the presence of TMEDA significantly reduced the level of monomer conversion.

COMPARATIVE EXAMPLE 24

In this experiment SBR was synthesized using a batch polymerization technique with N,N,N',N'-tetramethylethyldiamine (TMEDA), hexyltetrahydrofurfuryl ether (HTE), and ditetrahydrofurfuryl propane (DTP) being evaluated as modifiers. In the procedure used 800 grams of a 15 weight percent monomer premix in hexane was added to a 1 gallon (3.785 liter) glass bowl reactor. The premix contained 25 weight percent styrene and 75 weight percent 1,3-butadiene. An additional charge of 200 grams of hexane was added to the monomer premix solution, bringing the total monomer concentration in the reactor to 12 weight percent. All premix solutions were dried over a silica/mole sieve bed. The monomer solution was equilibrated at 65° C. After temperature equilibration, approximately 2.4 mmol of polar modifier, 1.2 mmol of pyrrolidine (PYR), and 1.2 mmol n-butyl lithium were added, in that order. The polar modifiers employed were N,N,N',N'-tetramethylethyldiamine (TMEDA), hexyltetrahydrofurfuryl ether (HTE), and ditetrahydrofurfuryl propane (DTP). Conversion was monitored by residual monomer analysis (Gas Chromatography). As can be seen from Table II, a monomer conversion of 100 percent was attained with all of the modifiers. At 100% conversion, the polymer cement was removed from the reactor, terminated with iso-propanol under a nitrogen blanket, and stabilized with BHT. Samples from each polymerization were dried for characterization. Table II shows the time to 100% conversion, weight average molecular weight (Mw), and the glass transition temperature for the SBR samples produced.

TABLE V

| System | 100% Conversion | Time to 100% Conversion | Mw | Tg |
| --- | --- | --- | --- | --- |
| TMEDA/PYR | Yes | 80 minutes | 139,000 | −28° C. |
| HTE/PYR | Yes | 45 minutes | 178,000 | −29° C. |
| DTP/PYR | Yes | 30 minutes | 125,000 | −25° C. |
| TMEDA | Yes | 130 minutes | 126,000 | −28° C. |

As can be seen from Table V, 100 percent conversion was reached with all of the modifiers. This example shows that high monomer conversions can be attained in batch polymerizations that are initiated with lithium amide initiator where the polymerization is modified with TMEDA or HTE.

While certain representative embodiments and details have been shown for the purpose of illustrating the subject invention, it will be apparent to those skilled in this art that various changes and modifications can be made therein without departing from the scope of the subject invention.

What is claimed is:

1. A process for synthesizing a rubbery polymer that comprises (1) continuously charging (a) a conjugated diolefin monomer, (b) an organolithium compound, and (c) an amine compound into a polymerization zone, wherein the amine compound is selected from the group consisting of alkyl, dialkyl, cycloalkyl or dicycloalkyl amine compounds of the general formula:

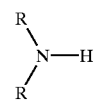

wherein R represents an alkyl group, a cycloalkyl group, or an alkaryl group containing from 1 to about 12 carbon atoms, and cyclic amine compounds of the general formula:

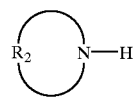

wherein $R_2$ represents a divalent alkylene, bicycloalkane, substituted alkylene, oxy- or N-alkylamino-alkylene group containing from about 3 to about 16 methylene groups, into a polymerization zone; (2) allowing the conjugated diolefin monomer to polymerize in the polymerization zone until a conversion of at least about 85 percent is attained to produce the rubbery polymer; and (3) continuously withdrawing the rubbery polymer from the polymerization zone.

2. A process as specified in claim 1 wherein the amine compound is of the general formula:

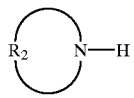

wherein $R_2$ represents a divalent alkylene group containing 4 carbon atoms.

3. A process as specified in claim 1 wherein the amine compound is of the general formula:

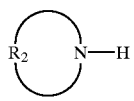

wherein $R_2$ represents a divalent alkylene group containing from 6 to 12 carbon atoms.

4. A process as specified in claim 1 wherein the amine compound is of the general formula:

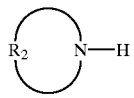

wherein $R_2$ represents a divalent alkylene group containing 6 carbon atoms.

5. A process as specified in claim 1 wherein the amine compound is of the general formula:

wherein R represents an alkyl group containing from 1 to 4 carbon atoms.

6. A process as specified in claim 1 wherein said process is conducted in the presence of a modifier.

7. A process as specified in claim 1 wherein the molar ratio of the amine compound to the organolithium compound is within the range of about 0.2:1 to about 1.5:1.

8. A process as specified in claim 1 wherein the molar ratio of the amine compound to the organolithium compound is within the range of about 0.4:1 to about 1.2:1.

9. A process as specified in claim 1 wherein the molar ratio of the amine compound to the organolithium compound is within the range of about 0.6:1 to about 1.1:1.

10. A process as specified in claim 1 wherein the molar ratio of the amine compound to the organolithium compound is within the range of about 0.7:1 to about 1.0:1.

11. A process as specified in claim 6 wherein the modifier is selected from the group consisting of methyltetrahydrofurfuryl ether, ethyltetrahydrofurfuryl ether, propyltetrahydrofurfuryl ether, butyltetrahydrofurfuryl ether, hexyltetrahydrofurfuryl ether, octyltetrahydrofurfuryl ether, dodecyltetrahydrofurfuryl ether, diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine, N-methyl morpholine, N-ethyl morpholine, and N-phenyl morpholine.

12. A process as specified in claim 6 wherein the modifier is N,N,N',N'-tetramethylethylenediamine.

13. A process as specified in claim 6 wherein the modifier is di-tetrahydrofurfurylpropane.

14. A process as specified in claim 1 wherein the organolithium initiator is present at a level which is within the range of 0.01 phm to about 1 phm; and wherein the polymerization is carried out at a temperature which is within the range of about –20° C. to about 180° C.

15. A process as specified in claim 1 wherein the organolithium initiator is present at a level which is within the range of 0.01 phm to about 0.1 phm; and wherein the polymerization is carried out at a temperature which is within the range of about 30° C. to about 125° C.

16. A process as specified in claim 1 wherein said conjugated diolefin monomer is 1,3-butadiene and wherein said rubbery polymer is polybutadiene rubber.

17. A process as specified in claim 1 wherein said conjugated diolefin monomer is 1,3-butadiene and wherein said process further comprises copolymerizing a vinyl aromatic monomer with said conjugated diolefin monomer.

18. A process as specified in claim 17 wherein said vinyl aromatic monomer is styrene and wherein said rubbery polymer is styrene-butadiene rubber.

19. A process as specified in claim 1 which further comprises coupling the rubbery polymer with a coupling agent selected from the group consisting of tin compounds, silicon compounds, and mixtures of tin compounds and silicon compounds.

20. A process as specified in claim 1 which further comprises blending the rubbery polymer with an organoclay.

* * * * *